United States Patent [19]

Köhler et al.

[11] Patent Number: 5,066,781

[45] Date of Patent: Nov. 19, 1991

[54] HEAT TREATED POLYARYLENE SULPHIDE CONTAINING PHOSPHINE GROUPS

[75] Inventors: Burkhard Köhler; Rolf-Volker Meyer, both of Krefeld, Fed. Rep. of Germany

[73] Assignee: Bayer Aktiengesellschaft, Leverkusen-Bayerwerk, Fed. Rep. of Germany

[21] Appl. No.: 552,808

[22] Filed: Jul. 16, 1990

Related U.S. Application Data

[62] Division of Ser. No. 436,127, Nov. 13, 1989, Pat. No. 5,010,169, which is a division of Ser. No. 336,716, Apr. 12, 1989, abandoned.

[30] Foreign Application Priority Data

Apr. 29, 1988 [DE] Fed. Rep. of Germany ....... 3714533

[51] Int. Cl.$^5$ ............................................. C08G 75/16
[52] U.S. Cl. ................................... 528/481; 528/388; 528/480
[58] Field of Search ...................... 528/388, 481, 480

[56] References Cited

U.S. PATENT DOCUMENTS 3,562,199 2/1971 Hill et al. .............................. 260/37
3,725,362 4/1973 Walker ................................... 260/79

FOREIGN PATENT DOCUMENTS 1056226 1/1967 United Kingdom .

OTHER PUBLICATIONS

Patent Abstracts of Japan, vol. 12, No. 230(C–508)[3077], Jun. 29, 1988.

*Primary Examiner*—Harold D. Anderson
*Attorney, Agent, or Firm*—Connolly and Hutz

[57] ABSTRACT

This invention relates to new straight chained and branched copolyarylene sulphides with built-in aromatic or araliphatic comonomers containing phosphine groups and to products obtainable from the phosphine group-containing polyarylene sulphides by a special heat treatment.

4 Claims, No Drawings

HEAT TREATED POLYARYLENE SULPHIDE CONTAINING PHOSPHINE GROUPS

This invention relates to new straight chained and branched copolyarylene sulphides with built-in aromatic or araliphatic comonomers containing phosphine groups and to products which are obtainable from the polyarylene sulphides containing phosphine groups by a special heat treatment.

Polyarylene sulphides are increasingly used in the electrical industry as inert thermoplasts which are not only highly temperature resistant but also can be used with a high filler content of glass fibres and/or other minerals.

Owing to the simpler methods by which they can be processed, these polymers, especially polyparaphenylene sulphide (PPS), are also being used to an increasing extent in other fields which have hitherto been the reserve of duroplasts. Their uses include not only the manufacture of simple parts such as transistors and capacitors but also the production of microchips.

It is known that a delay in the onset of crystallisation of a thermoplast may in certain cases be an advantage, for example in order to avoid premature solidification of the flow front in injection moulding.

It is known e.g. DE-OS 3 517 452) that the crystallisation temperature may be lowered by a thermal aftertreatment in the presence of basic metal compounds. These polyarylene sulphides may, however, have a raised electrolyte content.

It has now been found that a polyarylene sulphide which has been prepared from a dihalogenated benzene, preferably p-dichlorobenzene, and di- or trihalogenated triaryl- or arylalkylphosphines and sodium sulphide has a much lower crystallisation temperature than polyparaphenylene sulphide without having a raised electrolyte content. A further reduction in the crystallisation temperature may be obtained by subsequent heat treatment of the new polyarylene sulphides according to the invention.

The present invention thus relates to straight chained or branched polyarylene sulphides which may be prepared in known manner from 0.1 to 10 mol-%, preferably 0.2 to 2.5 mol-% of monomers corresponding to formula (I)

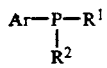

and 90–99.0 mol-%, preferably 97.5–99.8 mol-%, of monomers corresponding to formula (II)

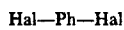

in which
Ar stands for a $C_6$–$C_{14}$-aryl group or a $C_5$–$C_{14}$-heteroaromatic group containing 1 to 3 halogen atoms, preferably 1 or 2 chlorine atoms,
$R^1$ may have the same meaning as Ar or stand for a $C_1$–$C_{22}$-alkyl, $C_6$–$C_{15}$-aralkyl or $C_6$–$C_{14}$-aryl group and
$R^2$ may have the same meaning as Ar or $R^1$ and the sum of all the halogen atoms is at least 2, preferably 2 or 3,
Ph stands for a para- or meta-phenylene group or a 4,4'-diphenylene group, preferably a para-phenylene group and Hal stands for halogen such as fluorine, chlorine, bromine or iodine, preferably chlorine.

In the heteroaromatic groups, up to two of the ring carbon atoms may be replaced by N, O or S.

$C_1$–$C_4$-Alkyl and $C_6$–$C_{14}$-aryl groups are examples of substituents optionally attached to the aromatic or heteroaromatic groups.

The comonomers I may be incorporated in the main chain in random distribution or in blocks.

The following are examples of comonomers corresponding to formula I: 4,4',4"-Trichloro-triphenylphosphine, 3,3',3"-trichloro-triphenylphosphine, 4,4'-dichloro-triphenylphosphine, bis-4-chlorophenylmethylphosphine and bis-4-chlorophenyl-methylphosphine and bis-4-chlorophenylhexylphosphine, 3,5-dichlorophenyl-diphenylphosphine, 2,4-dichlorophenyl-diphenylphosphine, 3,5-dichlorophenyldimethylphosphine, 2,4-dichlorophenyl-dimethylphosphine, dimethyl-2,4,6-trichlorophenylphosphine, diphenyl-2,4,6-trichlorophenylphosphine, 3,5-dichlorophenyl-dihexylphosphine, 3,5-dichlorophenylphospholane and 2,4-dichlorophenylphospholane.

The polyarylene sulphides according to the invention may be prepared, for example, by a reaction of the monomers of formulae I and II with a reagent which releases sulphide and an inorganic base in a dipolar aprotic solvent.

The inorganic bases and sulphide releasing reagents used are preferably alkali metal sulphides, which are known for this purpose, especially sodium sulphide. The dipolar aprotic solvents used may be, for example, N-alkyllactams, preferably N-methyllactams, most preferably N-methylcaprolactam.

The phosphines I are used to an extent of from 0.1 to 10 mol-%, preferably from 0.5 to 2.5 mol-%, and the sum of monomers of formula (II) used in the process is from 90 to 99.9 mol-%, preferably from 97.5 to 99.5 mol-%, based on the sum of the compounds of formulae (I) and (II) put into the process. It is preferred to use phosphines whose P-atom is incorporated in the chain.

The alkali metal sulphide is used in a quantity corresponding to 1 to 2 equivalents, preferably 1 to 1.1 equivalents, and the ratio by volume of solvent/solid is from 1:1 to 10:1.

The reaction may be carried out in the presence of catalysts such as r-caprolactam, amino acids or alkali metal acetates, chlorides, fluorides, arylsulphonates or alkylsulphonates.

The reaction temperature is in the range of from 150° to 300° C. The reaction may be carried out at pressures of from 1 to 20 bar.

The alkali metal sulphides may be used in an anhydrous form or as hydrates. Dehydration may be carried out in one or more stages, preferably by removal of the water e.g. by azeotropic distillation, e.g. using the monomers of formula II as entrainers. Alkali metal hydroxides may be used for regenerating the alkali metal sulphides.

The reactants may in principle be brought together by any desired method. The dihalogenated aromatic compounds and their halogenated phosphines of formula I may be added together or separately, continuously or portionwise or directly all at once to the alkali metal sulphide or to the solvent or portionwise to a part thereof.

The alkali metal sulphide may also be added to the compounds of formula I and dihalogenated aromatic compounds II together with the solvent or with a part thereof. Alternatively, all the reactants may be added together directly. Other combinations of adding the reactants together may also be used.

The dosing time for the reaction components ranges from 0 to 10 hours and the after-condensation time from 3 to 24 hours, preferably from 6 to 14 hours.

Working up of the reaction mixture and isolation of the polyarylene sulphides according to the invention may be carried out in known manner, for example by precipitating the reaction mixture in an alcohol, e.g. isopropanol, and washing the precipitated polyarylene sulphide free from electrolytes, e.g. after acidification. The washing liquid used is preferably water.

Even with very low comonomer contents, the polyarylene sulphides according to the invention have a greatly reduced crystallisation temperature which may be even further reduced by thermal after-treatment.

The invention also relates to the products which may be prepared by heating the phosphine group-containing polyarylene sulphides according to the invention to temperatures of 280° to 450° C. for 1 to 100 minutes, preferably 2 to 45 minutes. Heating may be carried out under an inert gas (e.g. $N_2$, Ar), optionally in a vacuum. Polyarylene sulphides according to the invention which have been thermally after-treated are distinguished by a further greatly reduced speed of crystallisation.

The polyarylene sulphides according to the invention are suitable e.g. for the production of moulded articles by injection moulding or extrusion, preferably for coating micro chips and other electronic parts, etc.

EXAMPLES

General method of procedure 608.24 g (4.16 mol) of p-Dichlorobenzene and 2.5 l of N-methylcaprolactam are introduced into a 4-l steel tank and heated to 216° C. A mixture of 1149.3 g (8.94 mol) of sodium sulphide trihydrate, 325 g of water, 4 g (0.1 mol of sodium hydroxide and 141.1 g (1.24 mol) of ε-caprolactam is added dropwise at such a rate that the sump temperature is maintained at 215° C. The water added and the water of hydration distil off in the process. 608.24 g (4.16 mol) of p-dichlorobenzene are added dropwise during the addition of sodium sulphide. This dropwise addition takes 4 hours. The reaction mixture is then heated to 240° C. for 9 hours and the contents of the 4-l tank are discharged into 40 l of isopropanol. After acidification to pH 1, the precipitated polymer is removed by suction filtration and washed free from electrolytes with distilled water.

COMPARISON EXAMPLE

The procedure is analogous to that of the general method. The yield is 95%.

Some properties of the products obtained according to the Comparison Example and the following Examples are summarised in Table I.

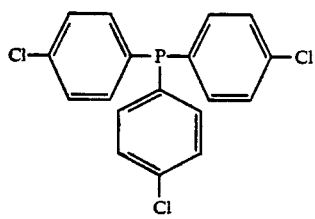

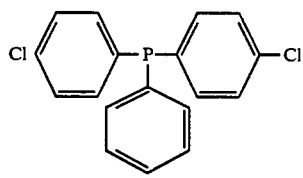

EXAMPLE 1

The procedure is analogous to that of the general method of procedure but instead of the addition of 608.24 g of p-dichlorobenzene, a mixture of 25 g of Ib and 597.24 g of p-dichlorobenzene is added dropwise during the process of dehydration. The yield is 95%.

EXAMPLE 2

The procedure is analogous to that of the general method but instead of the addition of 608.24 g of p-dichlorobenzene, a mixture of 50 g of Ib and 586.24 g of p-dichlorobenzene is added dropwise during the process of dehydration. The yield is 95%.

EXAMPLE 3

The procedure is analogous to that of the general method but instead of the addition of 608.24 g of p-dichlorobenzene, a mixture of 15 g of Ia and 602.16 g of p-dichlorobenzene is added dropwise during dehydration. The yield is 95%.

EXAMPLE 4

The procedure is analogous to that of the general method but instead of the addition of 608.24 g of p-dichlorobenzene, a mixture of 30 g of Ia and 596.08 g of p-dichlorobenzene is added dropwise. The yield is 95%.

EXAMPLES 5 to 8

The products of Examples 1 to 4 are heated to 400° C. for 10 minutes under nitrogen.

EXAMPLES 9 to 12

The products of Examples 1 to 4 are heated to 400° C. for 45 minutes under nitrogen.

TABLE I

Properties of the polyarylene sulphides containing phosphine groups.

| Example | Mol % of Ia | Mol % of Ib | Mol % of p-Dcb | Time (min) of heating at 400° C. | $T_k$ (°C.) | $H_k$ (J/g) | Tm (°C.) |
|---|---|---|---|---|---|---|---|
| Comparison | 0 | 0 | 100 | 0 | 235 | 53.9 | 278 |
| 1 | 0 | 0.91 | 99.09 | 0 | 201.1 | 36.5 | 274.1 |
| 2 | 0 | 1.82 | 98.18 | 0 | 195.9 | 36.7 | 272.0 |
| 3 | 0.5 | 0 | 99.5 | 0 | 227.3 | 45.6 | 275.7 |
| 4 | 1.0 | 0 | 99.0 | 0 | 215.7 | 42.8 | 269.0 |
| 5 | 0 | 0.91 | 99.09 | 10 | 172.7 | 29.1 | 270.4 |
| 6 | 0 | 1.82 | 98.18 | 10 | 167.3 | 38.8 | 266.2 |
| 7 | 0.5 | 0 | 99.5 | 10 | 193.8 | 45.4 | 278.1 |
| 8 | 1.0 | 0 | 99.0 | 10 | 189.0 | 44.5 | 274.7 |
| 9 | 0 | 0.91 | 99.09 | 45 | 164.0 | 37.5 | 266.2 |
| 10 | 0 | 1.82 | 98.18 | 45 | 155.6 | 24.7 | 257.9 |
| 11 | 0.5 | 0 | 99.5 | 45 | 188.6 | 41.1 | 275.0 |
| 12 | 1.0 | 0 | 99.0 | 45 | 183.1 | 41.1 | 268.7 | p-Dcb = p-dichlorobenzene

The values for $T_k$, $H_k$ and Tm were determined by DSC measurements, $T_k$ being the crystallisation temperature on cooling from the melt, $H_k$ the heat of crystallisation and Tm the crystallite melting point.

We claim:

1. Linear or branched phosphorous containing polyarlene sulphide prepared by:

a. the reaction of 0.1 to 10 mol-% of at least one monomer corresponding to the following formula $$Ar-\underset{\underset{R^2}{|}}{P}-R^1 \qquad (I)$$

wherein

P denotes phosphorous,

Ar denotes a $C_6$-$C_{14}$ aromatic group or a $C_5$-$C_{14}$ heteroaromatic group containing 1 to 3 halogen atoms, $R^1$ is identical to Ar or denotes a $C_1$-$C_{22}$-alkyl, $C_6$-$C_{15}$-aralkyl or $C_6$-$C_{14}$-aryl group, $R^2$ is identical to Ar to $R^1$, from 90 to 99.9 mol-% of at least one monomer corresponding to the formula II $$Hal-Ph-Hal \qquad (II)$$

wherein

Ph represents a para- or metaphenylene group of a 4,4'-diphenylene group and

Hal represents halogen and the sum of all the halogen atoms is at least 2, and 1 to 2 equivalents of an alkali metal sulfide and b. the subsequent heating of the isolated reaction product of step a. to 280°-450° C. for 1-100 minutes.

2. Linear or branched polyarylene sulphide according to claim 1 wherein 0.2 to 2.5 mol-% of the monomer of formula (I) is reacted.

3. Linear or branched polyarylene sulphide according to claim 1 wherein 97.5 to 99.8 mol-% of the monomer of formula (II) is used.

4. Shaped article comprising the polyarylene sulphide according to claim 1.

* * * * *